Patented Dec. 12, 1922.

1,438,232

UNITED STATES PATENT OFFICE.

ARDEN D. GREENLEE, OF WEBSTER GROVES, MISSOURI.

MANUFACTURED EGG.

No Drawing.   Application filed July 2, 1921. Serial No. 482,242.

*To all whom it may concern:*

Be it known that I, ARDEN D. GREENLEE, a citizen of the United States, residing at Webster Groves, in the county of St. Louis and State of Missouri, have invented certain new and useful Improvements in Manufactured Eggs, of which the following is a specification.

My invention has relation to improvements in preserving egg batter and process of making the same, and further consists in the production of a new composition of matter, wherein the egg liquid, either the whole egg or the white thereof, is rendered more desirable for baking purposes.

It is well known that eggs have heretofore been preserved by making them into a batter and freezing the batter at a temperature of about 0° F. The frozen egg may then be stored or transported long distances without deterioration so long as the temperature is maintained around 0° F. In fact, it is generally understood that eggs are better preserved by converting them into a batter and then freezing than they are by maintaining them in cold storage. However, the eggs are not always frozen as the whole egg, because the bakers want whites for certain kinds of cake (angel food for example) and yolks for other products, and after a batter has been made of the whole egg, the whites and yolks cannot be readily separated.

Formerly, the principal demand on the bakers was for fancy cakes, that could not be readily baked in the home, and cakes requiring egg whites only, because the housewife did not care to bake with the whites only as she then had the yolks on her hands and had to throw them away or find a use for them. As a result of this condition frozen egg whites were at a premium with but a moderate demand for the yolks. However, within the last few years, owing to the large increase in the demand for bakers' goods their products have greatly increased and they are now called upon to supply not only certain cakes but all kinds of cakes. The gold cake and other rich looking cakes are sought by the consumer in large quantities. The result is that the demand for frozen egg yolks has greatly increased with a corresponding falling off in the demand for whites, so that the producers are called upon to furnish frozen egg yolks, and at the same time they are unable to dispose of their frozen whites. Then, too, a cake containing egg yolks is richer, and will keep its freshness longer than one with whites because of the fatty matter in the yolk. The yolk contains substantially 33% fat, 17% protein, and 50% water, while the white contains no fat, 12% protein, and 88% water. Now, if the egg white is supplied with a fat in proper amount to cut the water down and ultimately have about 35% fat in the mixture, and this mixture emulsified into a homogeneous substance, it is virtually the equivalent of the yolk for baking purposes. This I have done, and this is what my invention contemplates, only I have discovered that an egg batter made up in this way is a more desirable product if certain other ingredients are added. Among these sugar and vanilla extract are the more desirable, as the sugar sweetens the mixture and also serves as a preservative for the protein, in the form of albumin, while the vanilla overcomes the unpleasant flavor of the fat which is preferably cotton seed oil, although other fats might be used. The composition of the batter with fat, sugar, and vanilla added would be substantially as follows:

| | | |
|---|---|---|
| Egg white { Albumin ---- 8%  Water ------ 58% } | 66 % |
| Cotton seed oil | 24 % |
| Sugar | 9.9% |
| Vanilla | .1% |
| Total | 100 % |

In the above it will be seen that the protein is cut down to 8%, which may be built up to 15% by adding milk-powder (or other protein) to the mixture. In this case the per cent of water would be decreased. In order to give the above mixture a rich color and render it just as desirable for cake baking as egg yolks I add a small per cent of butter color, although this is optional. The composition would then be as follows:

| | | |
|---|---|---|
| Egg white { Albumin ---- 8%  Water ------ 54% } | 62 % |
| Cotton seed oil | 24 % |
| Sugar | 10 % |
| Milk powder | 3.9% |
| Vanilla and color | .1% |
| Total | 100 % |

The above figures do not represent exact percentages and are merely given for examples as they may be varied slightly either way without materially affecting the product.

After the respective ingredients have been mixed with the egg white the mixture is thoroughly agitated so that the ingredients are broken up into finely divided particles all of which are so closely intermingled as to form a homogeneous mass from which the respective ingredients will not settle out. In other words, the mixture is converted into an emulsion. The emulsifying of the mixture is performed by an emulsifying machine of any desirable type, machines for this purpose being well known in the art.

In preparing batter of the whole egg I add a smaller percentage of fat since the yolk already contains fat, and the sugar is eliminated. Vanilla or other flavoring, such as oil of orange or lemon, is added, however, to the mixture.

A frozen egg batter prepared from egg whites as above set forth contains all the properties of the yolks and has the additional advantages that it will not thicken on thawing such as the yolks do.

Having described my invention, I claim:

1. A new article of manufacture consisting of emulsified egg white and fat, the proportion of fat being substantially equal to that of the natural egg.

2. A new article of manufacture consisting of an emulsion containing egg white, fat, and sugar, the proportion of fat being substantially equal to that of the natural egg yolk, said emulsion being frozen below the temperature of decomposition.

3. As a new article of manufacture, an intimate mixture of egg whites, fat, and a suitable protein, said mixture being frozen below the temperature of decomposition, and the fat and protein content being substantially in proportion to that in a natural egg.

4. As a new article of manufacture, an intimate mixture of egg whites, cotton seed oil and milk powder, said mixture being frozen below the temperature of decomposition, and the fat and protein content being substantially in proportion to that in a natural egg.

In testimony whereof I hereunto affix my signature.

ARDEN D. GREENLEE.